Sept. 1, 1925. 1,552,269
W. C. BRÖCKER
APPARATUS AND PROCESS FOR MAKING FISHING NETS
Filed Aug. 30, 1921
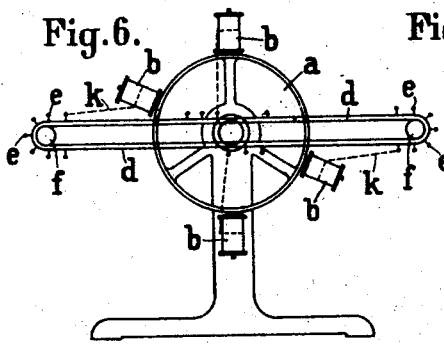
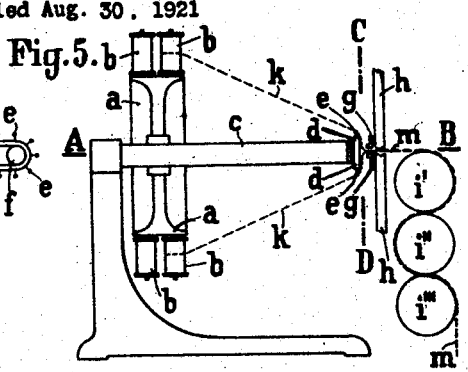
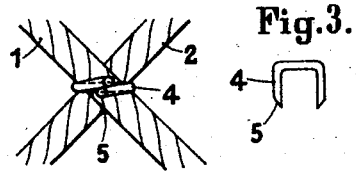
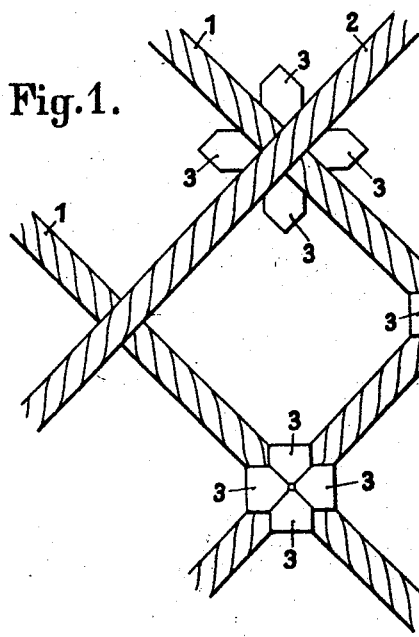
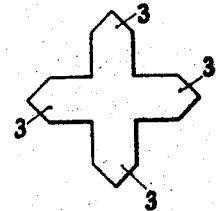
Inventor:
WALTER C. BRÖCKER
BY his ATTORNEYS Patented Sept. 1, 1925.

1,552,269

UNITED STATES PATENT OFFICE.

WALTER C. BRÖCKER, OF ITZEHOE, GERMANY.

APPARATUS AND PROCESS FOR MAKING FISHING NETS.

Application filed August 30, 1921. Serial No. 497,075.

*To all whom it may concern:*

Be it known that I, WALTER C. BRÖCKER, residing at Itzehoe, Germany, Brookhafen, have invented certain new and useful Improvements in and Relating to Apparatus and Processes for Making Fishing Nets, of which the following is a specification, for which I have filed applications for patents in Germany on July 11, 1919, and December 3, 1919.

The invention relates to the manufacture of nets, and especially to the manufacture of such nets as are used for fishing purposes and it consists therein that the threads are united by means of clamps and preferably by means of metallic wire clamps.

The invention further relates to a process for manufacturing these nets preferably by means of machinery.

Upon the drawing in Figs. 1 and 2 a part of a net according to the invention with cross shaped clamps and a clamp in detail are illustrated.

Fig. 3 shows another kind of a clamp for uniting the crossing points,

Fig. 4 such a crossing point locked with a clamp according to Fig. 3.

Figs. 5, 6 and 7 show a device which enables a suitable crossing of the threads and the mechanical locking of the crossing points with the aid of clamps.

In Figs. 1 and 4, 1 are threads crossing with the threads 2. 3 are prongs connected cross wise which are shown in Fig. 1 on the top and in Fig. 2 in an open condition but in Fig. 1 in the centre and on the bottom in a closed condition.

Fig. 3 shows a clamp 4 formed of wire which at its ends 5 is preferably beveled and upon a pressure being exerted on the horizontal part of the clamp will bend over in the manner shown in Fig. 4 thereby locking the threads 1 and 2.

Through uniting the threads by means of clamps much thread is saved, as hereby the formation of knots is not required. Furthermore, with this mode of connection thick threads may be employed which are not suitable for being knotted and even stranded wire can be used.

In the Figs. 5 to 7 $a$ denotes the support for a thread-spool $b$ which in a suitable quantity is mounted on the spool-support $a$. The spool support $a$ is turnably mounted on a fixed pin $c$ which at the same time carries on its front end suitably an endless band or an endless chain $d$ on which are arranged eyes $e$ for the thread in the same number as there are thread-spools $b$. The endless chain $d$ is turnably mounted on two rollers $f$. $g$ are two guide ledges, while $h$ denotes a stamping system for fastening the metal clamps of the net, $i^1$, $i^2$, $i^3$ are rollers for moving the finished part of the net. $k$ are the yarn threads and $m$ the finished net. $n$ are side grippers which in every case can grip the outermost thread.

The device acts in the following manner: The yarn-threads pass from the spools $b$ through the yarn eyes $e$. Through moving the latter by means of the band or chain which preferably is always moved in the same direction, the yarn-threads of the uppermost row of eyes are displaced side ways with regard to the lower row of eyes. If, for example, the upper row of threads is moved towards the right, the lower one will pass to the left. In this manner in every case a crossing of the two rows of threads is obtained. The spools will rotate in the same direction as the endless chain. As soon as the crossing points lie directly underneath the various stamps of the stamping row $h$, a metal clamp from a storing reservoir or the like is placed over each crossing point and underneath the stamps which latter will force down the clamps and effect a locking of the crossing points. Then the removing rollers $i$ will rotate to an extent required for the respective size of meshes, the endless chain is again moved a certain amount until a new crossing point lies underneath the stamps of the stamping row. The grippers $n$ on the sides of the endless chain hold in every case the outmost thread upon the reversal of the endless chain taking place here, until a fastening of the crossing points by means of the clamps has been effected. It is of course not necessary to provide all crossing points with clamps. Furthermore apart from the clamps shown on the drawing, other forms of suitable clamps may be used and also several clamps for one and the same crossing point. The mode of moving the threads for crossing them can also be effected otherwise than with the aid of an endless band and instead of the one stamping device a plurality of the same may be employed.

Claims:

1. In a process for manufacturing nets for fishing purposes from fibrous threads producing the meshes row by row while pulling off the net step by step as the individual rows are finished, crossing the threads diagonally to the direction of travel of the net during manufacturing, and uniting them at the crossing points with clamps.

2. In a process for manufacturing nets for fishing purposes from fibrous threads producing the meshes row by row while pulling off the net step by step as the individual rows are finished, crossing the threads diagonally to the direction of travel of the net during manufacturing, and uniting them at the crossing points with metallic clamps.

3. In a process for manufacturing nets for fishing purposes from fibrous threads producing the meshes row by row while pulling off the net step by step as the individual rows are finished, crossing the fibrous threads, diagonally to the direction of travel of the net during manufacturing, and uniting them at the crossing points with the aid of wire clamps.

4. In a process for manufacturing nets for fishing purposes from fibrous threads producing the meshes row by row while pulling off the net step by step as the individual rows are finished, crossing the threads diagonally to the direction of travel of the net during manufacturing, and uniting them at the crossing points with wire clamps having previously bevelled points.

5. In a process for manufacturing nets for fishing purposes from fibrous threads producing the meshes row by row while pulling off the net step by step as the individual rows are finished, crossing the threads diagonally to the direction of travel of the net during manufacturing with the aid of a guiding device mounted on an endless conveying device.

6. In a process for manufacturing nets for fishing purposes from fibrous threads producing the meshes row by row while pulling off the net step by step as the individual rows are finished, crossing the threads diagonally to the direction of travel of the net during manufacturing with the aid of an endless conveying device, having two sections lying closely opposite to each other.

7. In a process for manufacturing nets for fishing purposes from fibrous threads producing the meshes row by row while pulling off the net step by step as the individual rows are finished, crossing the threads diagonally to the direction of travel of the net during manufacturing with the aid of an endless conveying device, having two sections lying closely opposite to each other and moving always in one and the same direction.

8. In a process for manufacturing nets for fishing purposes from fibrous thread producing the meshes row by row while pulling off the net step by step as the individual rows are finished, leading the threads from a spool carrier to an endless conveying device, crossing the threads diagonally to the direction of travel of the net during manufacturing, and rotating the spool carrier in the same direction in which the said conveyor moves.

9. In a machine for manufacturing nets for fishing purposes, a rotatable bobbin carrier with a plurality of bobbins each adapted to carry a fibrous thread, means for pulling off the finished part of the net step by step, other means for crossing a said thread subsequently with each of the other said threads diagonally to the direction of travel of the net during manufacturing, and uniting means for uniting the threads on the crossing points by means of clamps.

10. In a machine for manufacturing nets for fishing purposes, a rotatable bobbin carrier with a plurality of bobbins each adapted to carry a fibrous thread, means for pulling off the finished part of the net step by step, other means for crossing a first series of said threads with a second series of said threads diagonally to the direction of travel of the net during manufacturing so that each thread of the first series subsequently crosses each thread of the second series, and uniting means for uniting the threads on the crossing points by means of clamps.

11. In a machine for manufacturing nets for fishing purposes, a plurality of bobbins each adapted to carry a fibrous thread, a rotatable bobbin carrier carrying each of the said bobbins, means for crossing subsequently each of the said threads with the other ones, and uniting means for uniting the threads on the crossing points by means of clamps.

12. In a machine for manufacturing fishing nets from fibrous threads, an endless band with thread holders for crossing the threads, and a device for bringing the threads close to each other.

13. In a machine for manufacturing fishing nets from fibrous threads, bobbins each carrying a fibrous thread means for producing and pulling off meshes row by row, means for crossing the said threads with each other, and a row of clamping devices adapted to unite the crossing points of the threads with each other by means of clamps.

14. In a machine for manufacturing fishing nets from fibrous threads, a turning spool-carrier for supporting the threads, an endless conveying device for crossing the threads moving always in the same direction as the spool-carrier, means for bringing the threads close together at their crossing points, and clamping devices adapted to unite the crossing points of the threads with each other by means of clamps.

15. In a machine for manufacturing nets for fishing purposes, a plurality of bobbins each adapted to carry a fibrous thread, and an endless conveying device with thread leaders for crossing subsequently each of the said threads with the other ones.

16. In a machine for manufacturing nets for fishing purposes, a plurality of bobbins each adapted to carry a fibrous thread, an endless conveying device with thread leaders for crossing subsequently each of the said threads with the other ones, and a device for bringing the threads on the crossing points close together.

In testimony whereof I have affixed my signature.

WALTER C. BRÖCKER.